(12) United States Patent
Yoshida et al.

(10) Patent No.: US 9,902,432 B2
(45) Date of Patent: Feb. 27, 2018

(54) VEHICLE REAR STRUCTURE

(71) Applicant: HONDA MOTOR CO., LTD., Tokyo (JP)

(72) Inventors: Shinjiro Yoshida, Wako (JP);
Tomohiro Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/391,087

(22) Filed: Dec. 27, 2016

(65) Prior Publication Data

US 2017/0197664 A1    Jul. 13, 2017

(30) Foreign Application Priority Data

Jan. 13, 2016  (JP) ................................. 2016-004039

(51) Int. Cl.
| | |
|---|---|
| *B62D 21/15* | (2006.01) |
| *B62D 25/02* | (2006.01) |
| *B62D 25/04* | (2006.01) |
| *B62D 25/06* | (2006.01) |
| *B62D 25/08* | (2006.01) |
| *B62D 25/16* | (2006.01) |
| *B62D 21/02* | (2006.01) |
| *B62D 25/20* | (2006.01) |

(52) U.S. Cl.
CPC ........... *B62D 25/088* (2013.01); *B62D 21/02* (2013.01); *B62D 25/02* (2013.01); *B62D 25/04* (2013.01); *B62D 25/06* (2013.01); *B62D 25/08* (2013.01); *B62D 25/16* (2013.01); *B62D 25/2027* (2013.01)

(58) Field of Classification Search
CPC .... B62D 21/02; B62D 21/152; B62D 21/157; B62D 25/02; B62D 25/04; B62D 25/087; B62D 25/088; B62D 25/2027; B62D 25/2036; B62D 25/16
USPC ............ 296/193.05, 193.06, 193.08, 203.03, 296/203.04, 187.11, 187.12
See application file for complete search history.

(56) References Cited

U.S. PATENT DOCUMENTS

| | | | |
|---|---|---|---|
| 8,690,218 B2 * | 4/2014 | Kuhl .................... | B62D 25/025 296/193.08 |
| 9,815,500 B1 * | 11/2017 | Lee, III ................ | B62D 27/023 |
| 2010/0032229 A1 * | 2/2010 | Kim ..................... | B62D 25/087 180/312 |

(Continued)

FOREIGN PATENT DOCUMENTS

| | | |
|---|---|---|
| JP | 2-11775 U | 1/1990 |
| JP | 11-180347 A | 7/1999 |

(Continued)

OTHER PUBLICATIONS

Office Action dated Sep. 26, 2017, issued in counterpart Japanese Application No. 2016-004039, with English machine translation. (24 pages).

*Primary Examiner* — Gregory Blankenship
(74) *Attorney, Agent, or Firm* — Westerman, Hattori, Daniels & Adrian, LLP (57) ABSTRACT

A vehicle rear structure includes an annular frame, which connects a rear cross member, gussets, rear quarter pillars, upper stiffeners, and a roof arch to one another into an annular shape in a vehicle front view. Each of the upper stiffeners of the annular frame is connected to a damper attachment portion of a rear wheel house by a coupling member.

13 Claims, 11 Drawing Sheets

(56) References Cited

U.S. PATENT DOCUMENTS

| | | | |
|---|---|---|---|
| 2013/0082482 A1* | 4/2013 | Kim | B62D 25/088 296/198 |
| 2013/0341970 A1* | 12/2013 | Shimizu | B62D 25/087 296/193.08 |
| 2014/0159433 A1* | 6/2014 | Katou | B62D 25/04 296/203.03 |
| 2015/0137559 A1* | 5/2015 | Lee | B62D 25/087 296/193.07 |
| 2015/0251703 A1* | 9/2015 | Yamada | B62D 25/087 296/187.12 |
| 2016/0023685 A1* | 1/2016 | Fujii | B62D 25/087 280/124.154 |
| 2016/0107701 A1* | 4/2016 | Anegawa | B62D 27/023 296/193.06 |
| 2016/0221610 A1* | 8/2016 | Nishimura | B62D 25/087 |
| 2016/0297481 A1* | 10/2016 | Yokoi | B62D 25/087 |
| 2016/0347141 A1* | 12/2016 | Fukutomi | B62D 25/088 |
| 2017/0113541 A1* | 4/2017 | Muramatsu | B60K 15/063 |
| 2017/0197664 A1* | 7/2017 | Yoshida | B62D 21/02 |
| 2017/0197665 A1* | 7/2017 | Kabayama | B62D 25/088 |
| 2017/0203795 A1* | 7/2017 | Freeman | B62D 27/02 |
| 2017/0305472 A1* | 10/2017 | Lee, III | B62D 25/088 |

FOREIGN PATENT DOCUMENTS

| | | |
|---|---|---|
| JP | 2011-143882 A | 7/2011 |
| JP | 5683707 B2 | 3/2015 |

* cited by examiner

VEHICLE REAR STRUCTURE

CROSS REFERENCES TO RELATED APPLICATIONS

The present, application claims priority under 35 U.S.C. § 119 to Japanese Patent Application No. 2016-004039, filed Jan. 13, 2016, entitled "Vehicle Rear Structure." The contents of this application are incorporated herein by reference in their entirety.

TECHNICAL FIELD

The present disclosure relates to a vehicle rear structure.

BACKGROUND

An existing rear floor panel In a vehicle rear body includes left and right side frames,, whose longitudinal direction is aligned with the vehicle front-rear direction, and a cross member, which connects these side frames to each other.

In addition, rear quarter pillars stand erect on rear side panels situated to the rear of respective rear door openings (rear seat openings) (see, for example, Japanese Patent No. 5683707). Rear wheel houses, which accommodate respective rear tires, are disposed under the rear quarter pillars.

The rear quarter pillars are disposed along the extension line of the cross member. In order to integrate the pillars and the cross member, upper stiffeners are disposed so as to extend across the respective rear wheel houses, so that the cross member and the rear quarter pillars are connected to each other.

A damper attachment portion is integrally disposed on each of the rear wheel houses so as to protrude from the rear wheel house at a position a predetermined distance away toward the vehicle rear from the position at which the corresponding upper stiffener is disposed.

In the existing vehicle rear structure having such a configuration, the load imposed on the damper attachment portions from the wheels is dispersed while being transmitted to the pillar inners of the rear quarter pillars through the rear wheel houses and the upper stiffeners.

Disadvantageously, however, a vehicle that has damper attachment portions shaped so as to protrude from the upper surfaces of the rear wheel houses and spaced apart from the rear quarter pillars is insufficient for transmitting the load imposed on the damper attachment portions to the rear quarter pillars to disperse the load.

SUMMARY

The present application describes, for example, a vehicle rear structure capable of efficiently dispersing the load imposed thereon from damper attachment portions.

According to an aspect of the application, a vehicle rear structure includes a pair of left and right side frames, whose longitudinal direction is aligned with a vehicle front-rear direction, a cross member that connects the side frames to each other, a pair of left and right rear quarter pillars that are disposed along rear side panels situated to the rear of rear door openings, rear wheel houses that are situated below the rear quarter pillars and that accommodate rear tires, each of the rear wheel houses including an upper surface portion and a damper attachment portion integrated with the upper surface portion and protruding from the upper surface portion, connecting members that connect the cross member to the respective rear quarter pillars so as to extend across the respective rear wheel houses, and coupling members that are joined to the respective rear wheel houses along ridgelines of the upper surface portions and that connect the damper attachment portions to the respective connecting members.

An aspect of the application provides a vehicle rear structure capable of efficiently dispersing the load imposed thereon from damper attachment portions.

BRIEF DESCRIPTION OF THE DRAWINGS

The advantages of the disclosure will become apparent in the following description taken in conjunction with the following drawings.

DETAILED DESCRIPTION

Referring now to the drawings, an embodiment is described below.

[Overview Configuration of Vehicle Rear Structure]

Figure 1:
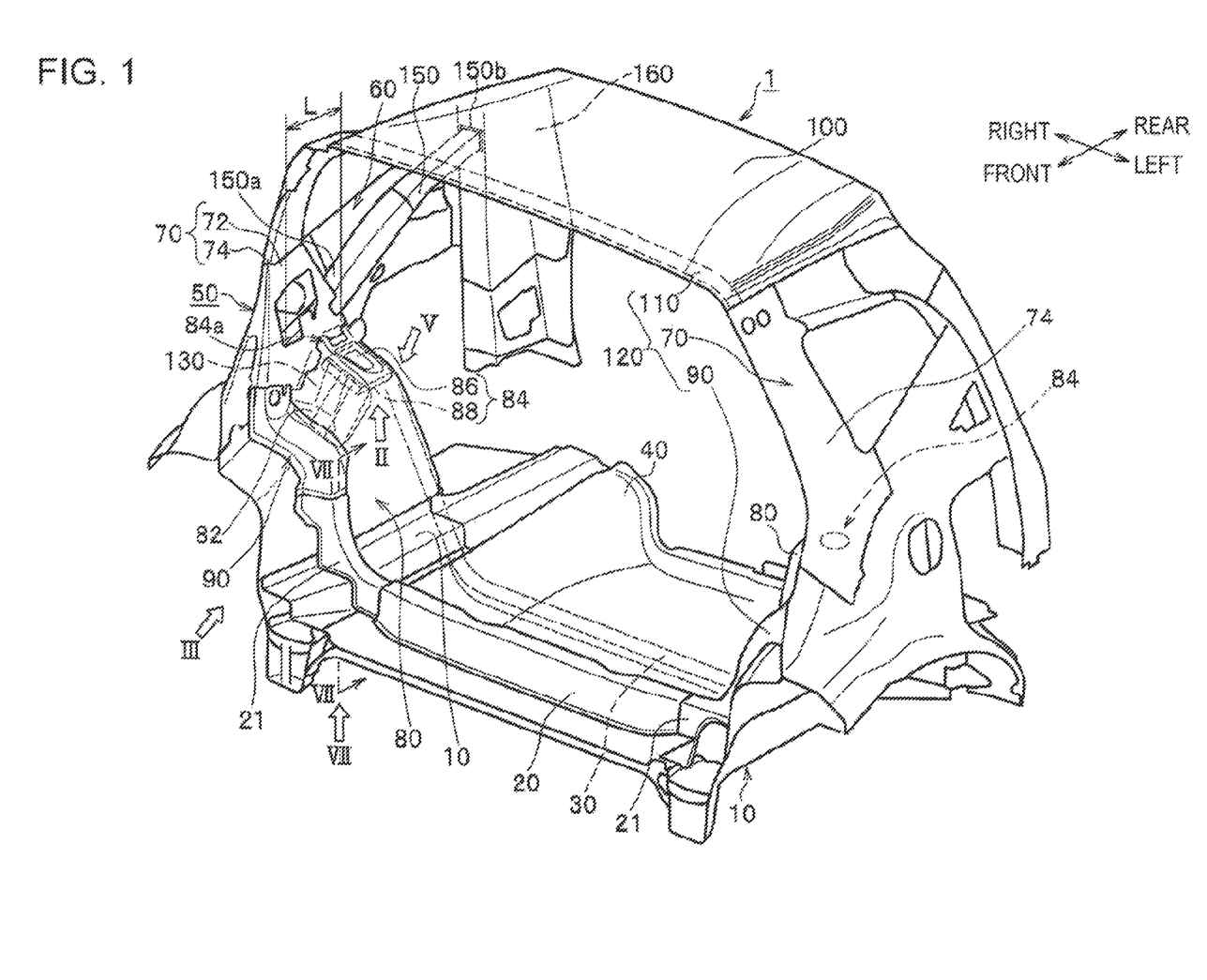
FIG. 1 is a perspective view of the overview of a vehicle rear body of a vehicle rear structure according to an embodiment.

FIG. 1 is a perspective view of the overview of a vehicle rear body of a vehicle rear structure according to an embodiment.

A rear structure of a vehicle I according to an embodiment includes a pair of left and right side frames 10, whose longitudinal direction is aligned with the vehicle front-rear direction.

The side frames 10 are connected to each other by a rear cross member 20 and a floorpan cross member 30, extending in the vehicle width direction.

The rear cross member 20 and the floorpan cross member 30 are arranged side by side over a flat floor panel 40 while being spaced apart from each other at a predetermined distance in the vehicle front-rear direction.

Rear quarter pillars 70 stand erect on the inner side of rear side panels 60 situated to the rear of rear do or openings 50.

Under the rear quarter pillars 70, rear wheel houses 80 that accommodate rear tires 8 are disposed.

Each rear wheel house 80 includes an upper surface portion (upper wall portion) 82 and a damper attachment portion 84 integrated with the upper surface portion 82 and protruding from the upper surface portion 82.

Each damper attachment portion 84 according to the embodiment includes a protuberance 86, which protrudes upward from the upper surface portion 82 of the rear wheel house 80, and a metal plate 88, having a substantially L-shaped cross section, the periphery of the metal plate 88 being joined to the back surface of the protuberance 86 at an outer-side portion of the protuberance 86 to form a box shape.

An edge portion 84a of each damper attachment portion 84 facing the corresponding rear side panel 60 is connected to the corresponding rear quarter pillar 70. Each rear quarter pillar 70 includes an inner pillar 72, disposed on the vehicle interior side, and an outer pillar 74, disposed on the vehicle exterior side.

The inner pillar 72 and the outer pillar 74 are joined together and the edge portion 84a facing the rear side panel 60 is connected to the inner pillar 72.

Figure 10:
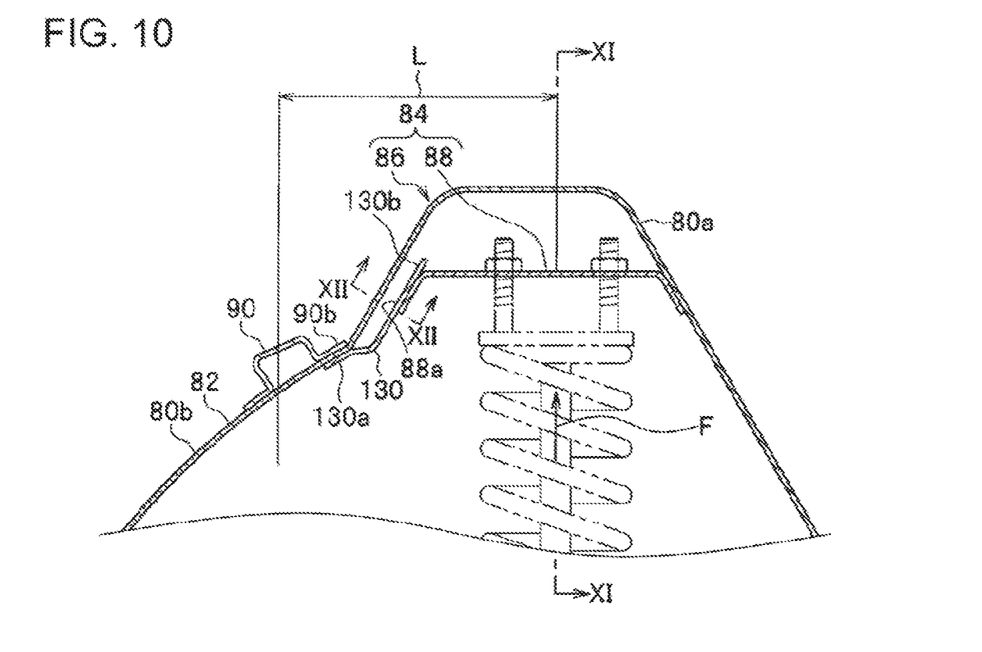
FIG. 10 is a sectional view of the wheel house of the vehicle rear structure according to an embodiment taken along line X-X of FIG. 5.

Further, an upper end portion of a damper is fixed to the metal plate 88 (see FIG. 10).

Upper stiffeners 90, serving as connecting members, are each disposed on the corresponding rear wheel house 80 so as to extend across the rear wheel house 80 in the vehicle width direction.

Each upper stiffener 90 connects a gusset 21, which extends from and is integrated with the rear cross member 20 at the left or right end portion, and the corresponding rear quarter pillar 70 to each other.

In the vehicle 1 according to the embodiment, the rear quarter pillars 70 are connected to each other by a roof arch 110 disposed on a roof panel 100.

Thus, an annular frame 120, in which the rear cross member 20, the gussets 21, the rear quarter pillars 70, the upper stiffeners 90, and the roof arch 110 are annularly connected together when the vehicle is viewed from the front, is formed.

A coupling member 130 is connected to each upper stiffener 90 of the annular frame 120 and the damper attachment portion 84 of the corresponding rear wheel house 80.

Figure 2:
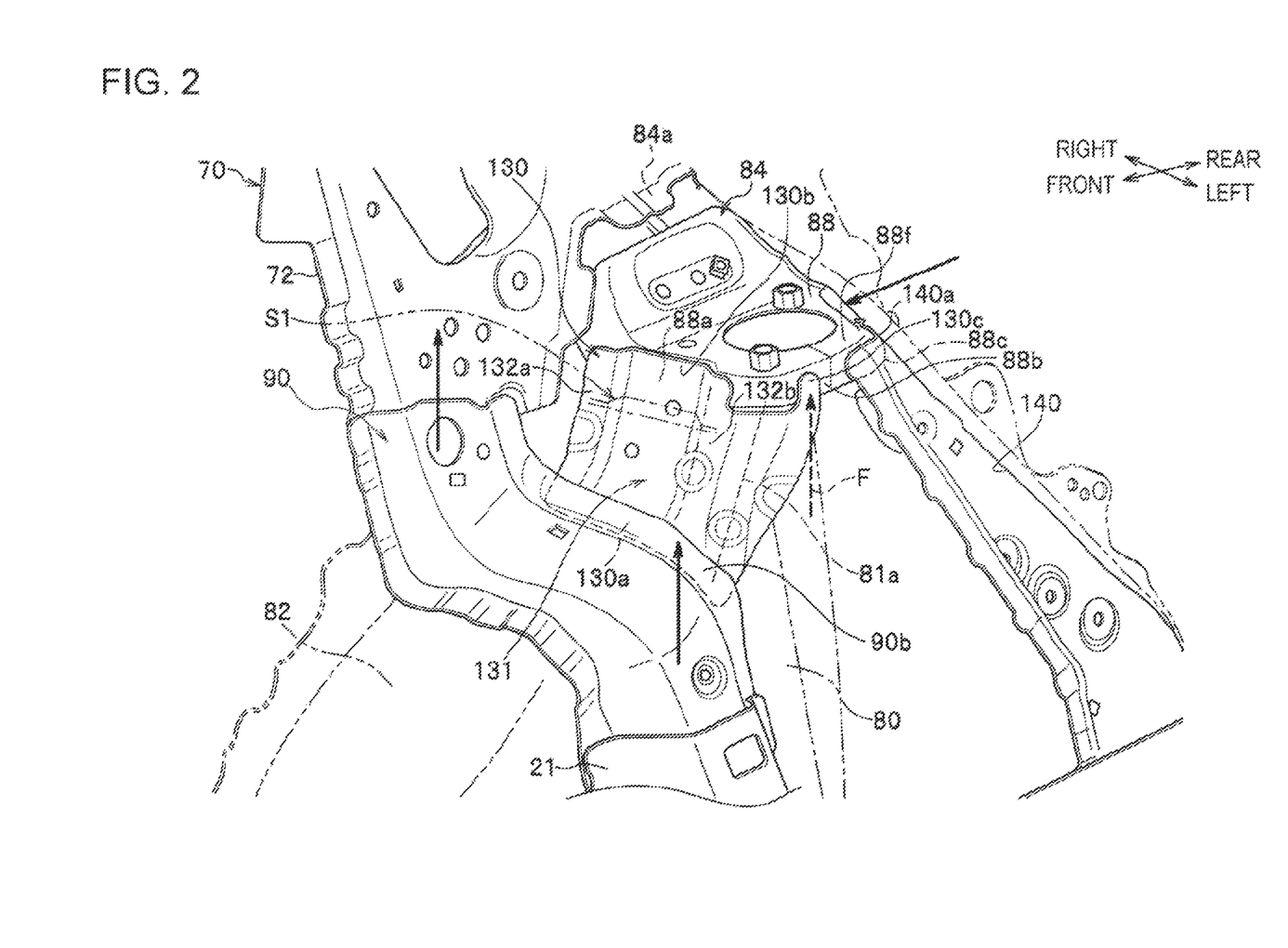
FIG. 2 is a perspective view of the vehicle rear structure according to an embodiment, in which a wheel house is perspectively shown in the direction of arrow II of FIG. 1.

FIG. 2 is a perspective view of the vehicle rear structure according to the embodiment, in which one rear wheel house 80 is perspectively shown in the direction of arrow II of FIG. 1.

Each metal plate 88 according to the embodiment includes a flat bearing surface portion 88f, mostly placed below and apart from the protuberance 86 of the corresponding rear wheel house 80 so as to be parallel to the protuberance 86. The bearing surface portion 88f includes a damper-fastened portion to which an upper end portion of a suspension damper, not illustrated, is fixed.

A front edge portion 88a, a side edge portion 88b, and a corner portion 88c are integrally formed around the bearing surface portion 88f so as to be bent at an angle substantially perpendicular to the bearing surface portion 88f.

In each metal plate 88 having a substantially L-shaped section, the front edge portion 88a, the side edge portion 88b, and the corner portion 88c, which are situated at the periphery of the metal plate 88, are joined to the back surface of the corresponding protuberance 86 at an outer-side portion of the protuberance 86. Thus, the damper attachment portion 84 is shaped like a box enclosed by the protuberance 86 and the bearing surface portion 88f of the metal plate 88.

Each coupling member 130 according to the embodiment has a substantially square-plate shape in a plan view and a hat shape in a sectional view. Each coupling member 130 includes a groove portion 131 and connection surface portions 132a and 132b, situated on both sides of the groove portion 131 and connected to the back surface of the corresponding rear wheel house 80. The coupling member 130 according to the embodiment, also includes an extending-to-vehicle-interior portion 130c, extending from and integrated with the connection surface portion 132b.

Each coupling member 130 is joined to the corresponding rear wheel house 80 such that a front edge portion 130a is brought into contact with the back surface of the upper surface portion 82 and so as to be situated opposite to an undersurface of a rear flange portion 90b of the corresponding upper stiffener 90 so that the front edge portion 130a, the rear wheel house 80, and the rear flange portion 90b are superposed one on another (see FIG. 10).

An upper surface of the front edge portion 88a of the metal plate 88 of each damper attachment portion 84 is joined to a rear edge portion 130b of the corresponding coupling member 130.

Each coupling member 130 also includes an extending-to-vehicle-interior portion 130c. The extending-to-vehicle-interior portion 130c extends from and is integrated with an end portion of the connection surface portion 132b while being bent at 90 degrees. An upper surface of the side edge portion 88b of the metal plate 88 of each damper attachment portion 84 is joined to the extending-to-vehicle-interior portion 130c for further enhancement of rigidity (see FIG. 12).

Figure 3:
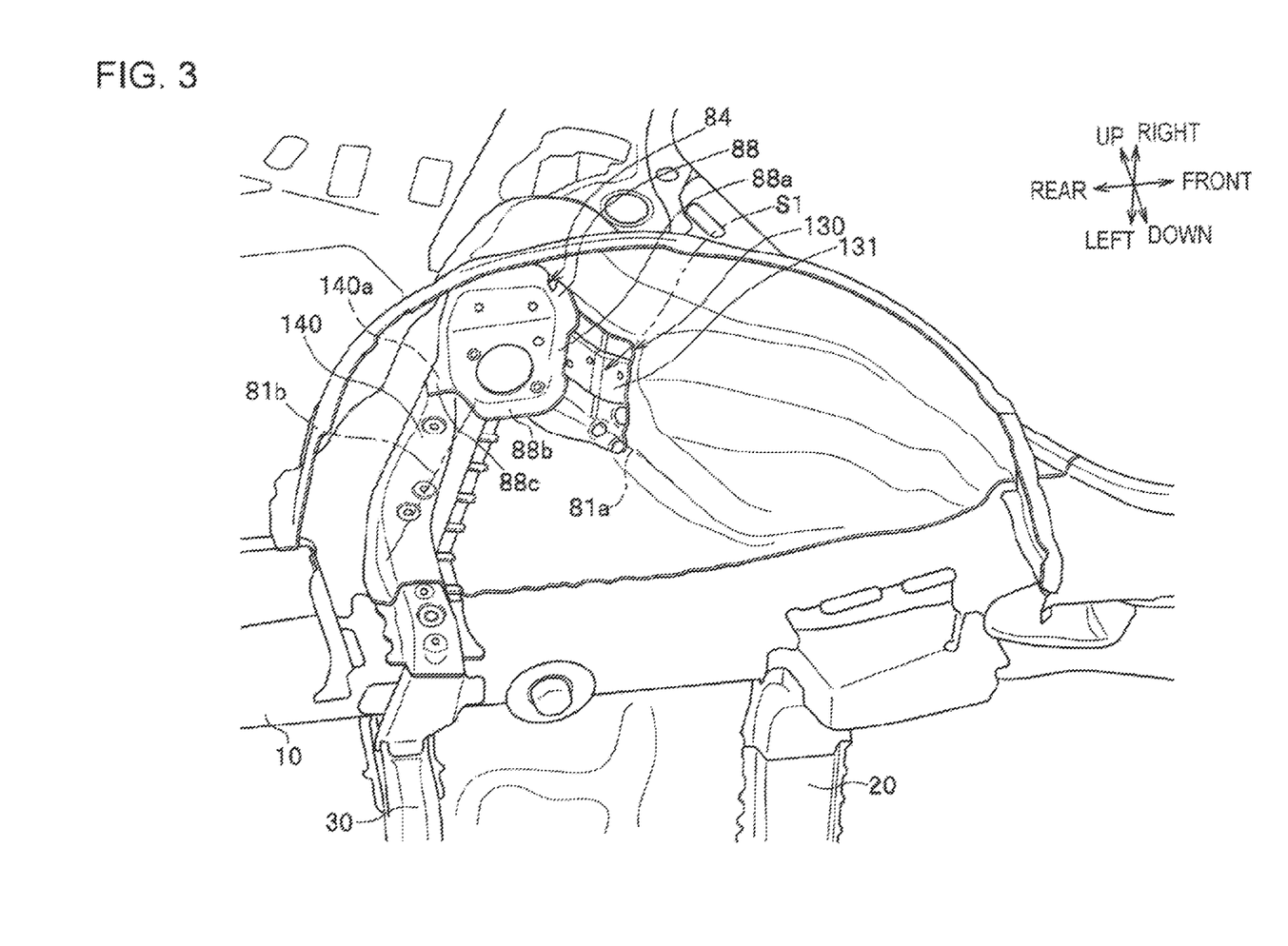
FIG. 3 is a perspective view of the back surface of the wheel house of the vehicle rear structure according to an embodiment, the back surface of the wheel house being viewed in the direction of arrow III of FIG. 1.

FIG. 3 is a perspective view of the back surface of the rear wheel house 80 of the vehicle rear structure according to an embodiment, the back surface being viewed in the direction of arrow III of FIG. 1.

Each coupling member 130 according to the embodiment is joined to the corresponding rear wheel house 80 while being placed so as to follow a ridgeline 81a of the upper surface portion 82. Thus, the groove portion 131 of each coupling member 130 and the upper surface portion 82 of the corresponding rear wheel house 80 define a closed section S1 (see FIG. 12).

Figure 4:
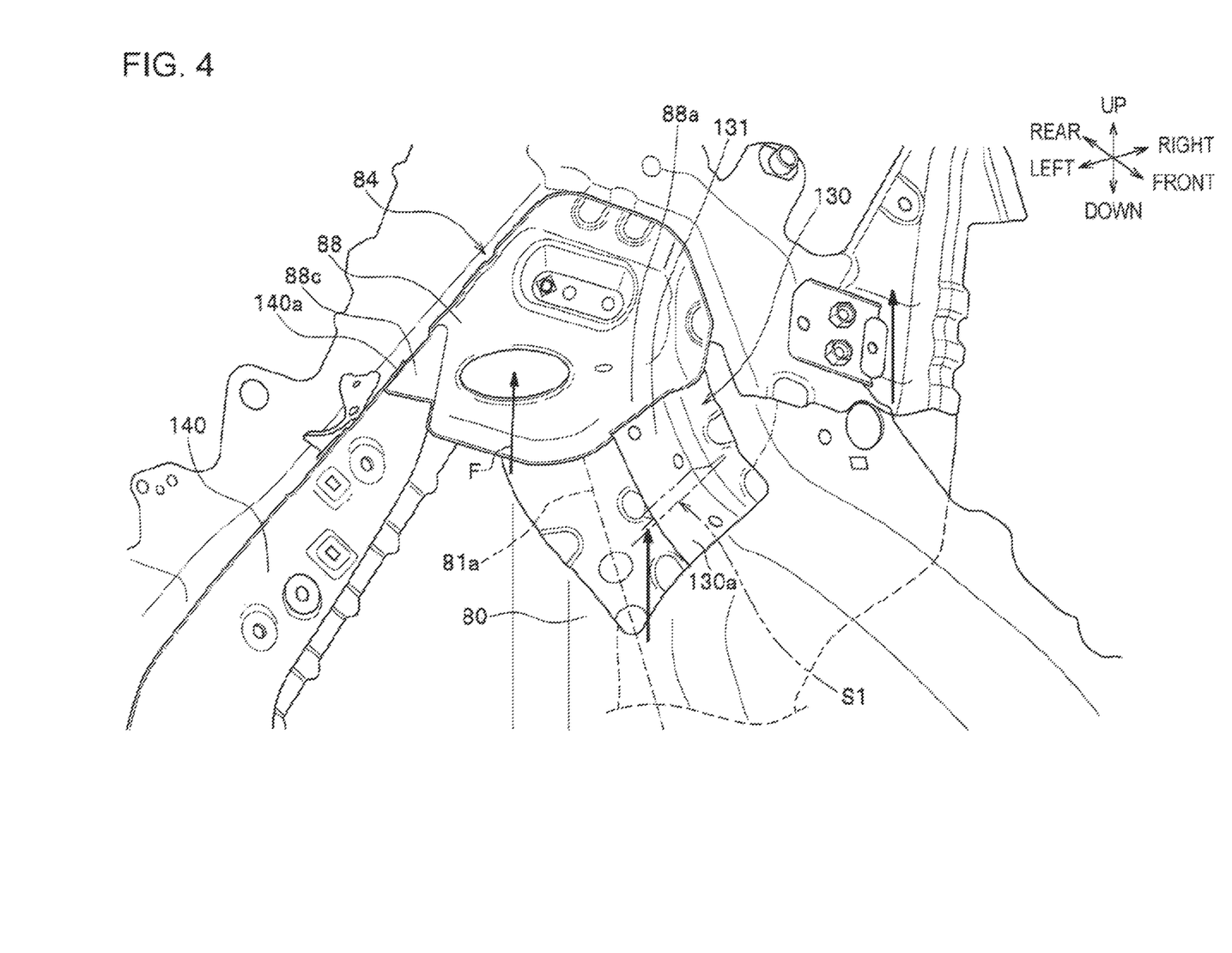
FIG. 4 is a perspective view of a main portion of the wheel house in FIG. 3 of the vehicle rear structure according to an embodiment, the main portion being viewed from the back surface.

FIG. 4 is a perspective view of a portion of the rear wheel house 80 in FIG. 3 of the vehicle rear structure according to an embodiment, the portion being viewed from the back surface.

A second reinforcement member 140 is disposed on the back surface of each rear wheel house 80 according to the embodiment so as to follow a ridgeline 81b extending to the rear. The second reinforcement member 140 has an upper-edge 140a connected to an upper surface of, for example, the metal plate 88.

Figure 5:
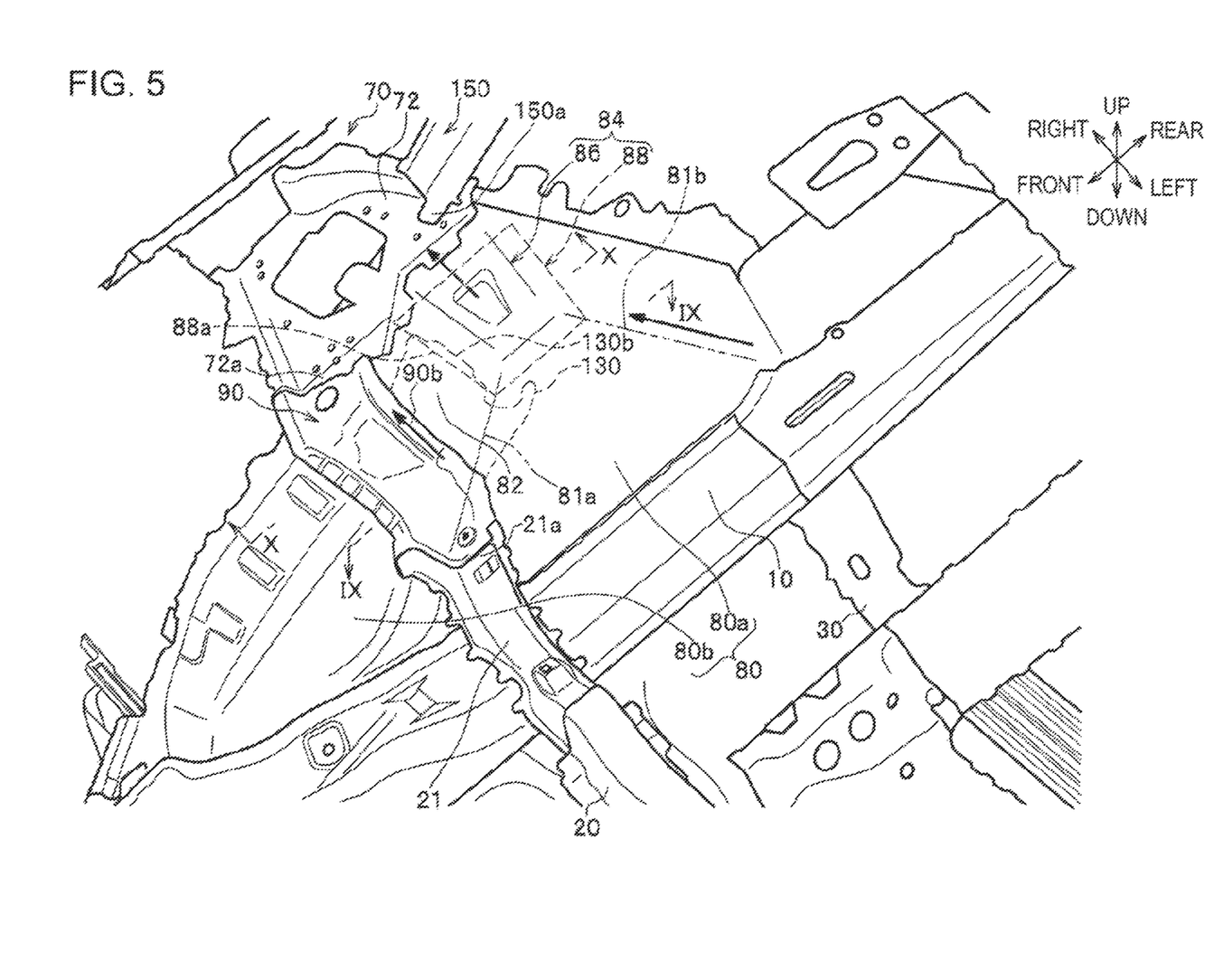
FIG. 5 is a perspective view of the vehicle rear structure according to an embodiment, in which the wheel house is perspectively shown in the direction of arrow V of FIG. 1.

FIG. 5 is a perspective view of the vehicle rear structure according to an embodiment, in which one rear wheel house 80 is perspectively shown in the direction of arrow V of FIG. 1.

In this embodiment, each rear wheel house 80 includes a mound portion 80a and an arcuate portion 80b.

The mound portion 80a is joined to the outer side of the side frame 10 in the vehicle width direction. The mound portion 80a has a mound shape (inverted-V shape) having the clamper attachment portion 84 at the top and the ridgelines 81a and 81b extending in the vehicle front-rear direction at the vehicle front and the vehicle rear so as to surround the damper attachment portion 84.

The arcuate portion 80b is situated to the vehicle front of the mound portion 80a in continuous with the mound portion 80a and curved mostly along the arcuate shape of the tire.

The upper stiffener 90 is disposed so as to extend across a joint between the mound portion 80a and the arcuate portion 80b. The upper stiffener 90 connects an upper edge portion 21a of the gusset 21, extending across the side frame 10, and a lower edge portion 72a of the inner pillar 72 of the rear quarter pillar 70 to each other.

Figure 6:
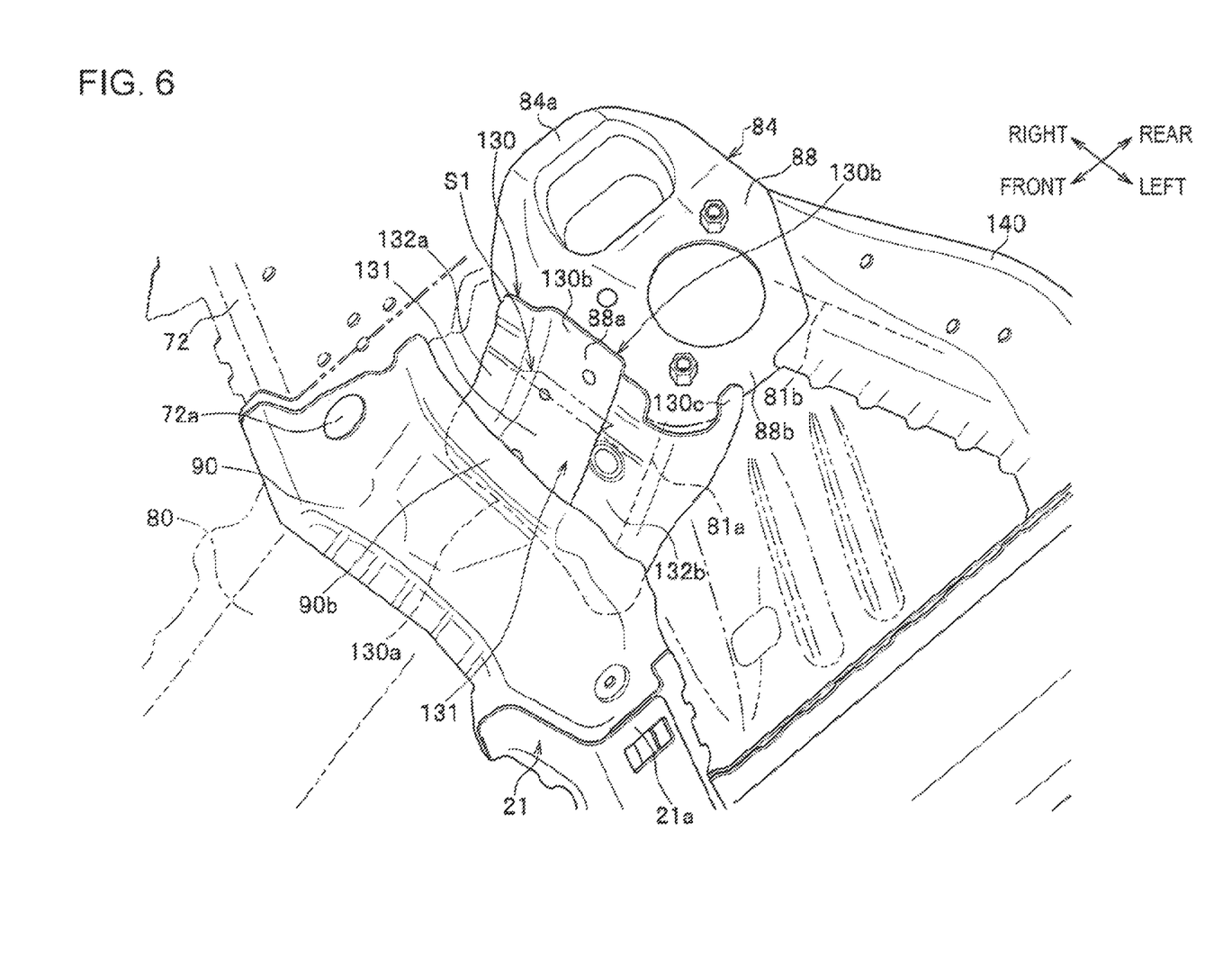
FIG. 6 is a perspective view of a main portion of the vehicle rear structure according to an embodiment, in which the wheel house illustrated in FIG. 5 is perspectively shown.

FIG. 6 is a perspective view of the vehicle rear structure according to an embodiment, in which the rear wheel house 80 illustrated in FIG. 5 is perspectively shown.

The gusset 21, extending across the side frame 10, has a substantially hat-shaped section.

Figure 7:
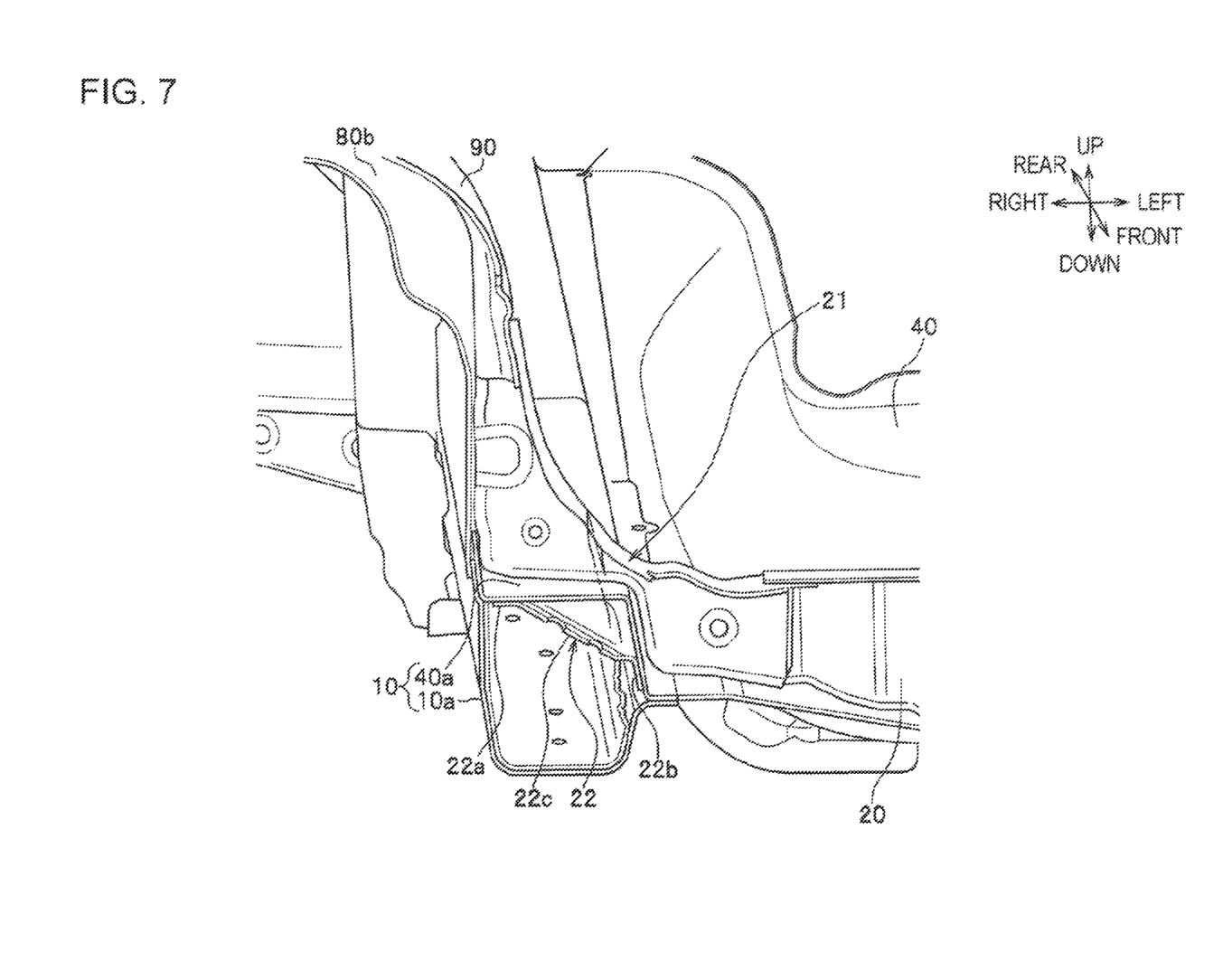
FIG. 7 is a sectional view of the vehicle rear structure according to an embodiment taken along line VII-VII of FIG. 1.

FIG. 7 is a sectional view of the vehicle rear structure according to an embodiment taken along line VII-VII of FIG. 1.

Each side edge portion 40a of the floor panel 40 in the vehicle width direction is cranked and joined to a side-frame outer member 10a to form a hollow side frame 10 extending in the vehicle front-rear direction. The side edge portion 40a of the floor panel 40 forming the side frame 10 is likely to be deformed in a direction in which an upper wall portion and a side wall portion are spaced further apart from each other by a load F imposed in a vehicle up-down direction. Thus, a reinforcement member 22 for widening prevention is disposed on the inner side of the side frame 10 at the position at which the gusset 21, connecting the upper stiffener 90 and the rear cross member 20 to each other, extends across the side frame 10.

The reinforcement member 22 includes an external flange 22a, connected to the back surface of an upper wall portion of the side edge portion 40a, an internal flange 22b, connected to a portion near a lower edge of a vertical wall portion of the side edge portion 40a, and a bridge surface portion 22c, disposed so as to extend obliquely.

Thus, the side edge portion 40a is prevented from being deformed in the direction in which the upper wall portion and the side wall portion are spaced further apart from each other.

Figure 8:
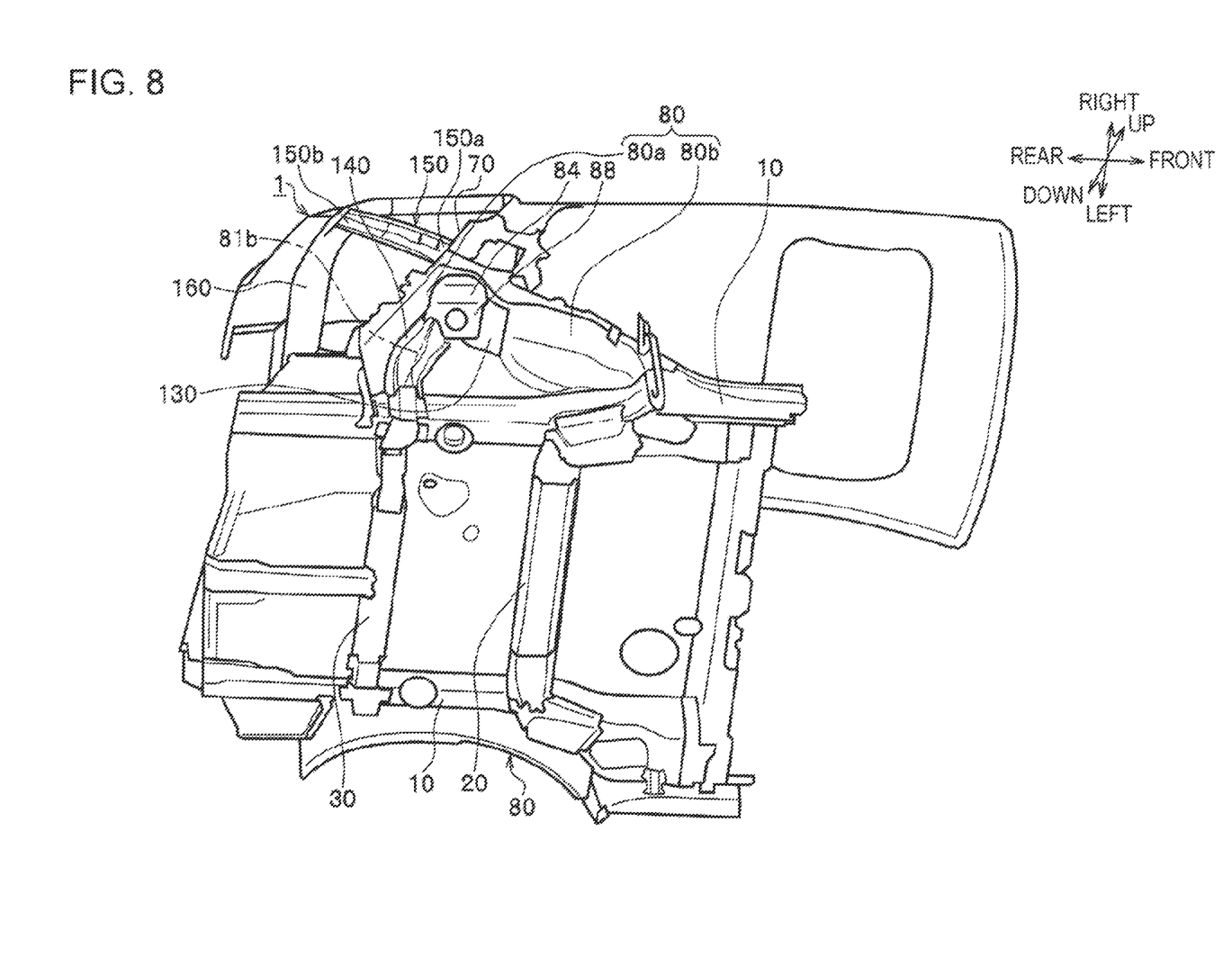
FIG. 8 is a perspective view of a vehicle rear body of the vehicle rear structure according to an embodiment, the vehicle rear body being viewed from the direction of arrow VIII of FIG. 1.
Figure 9:
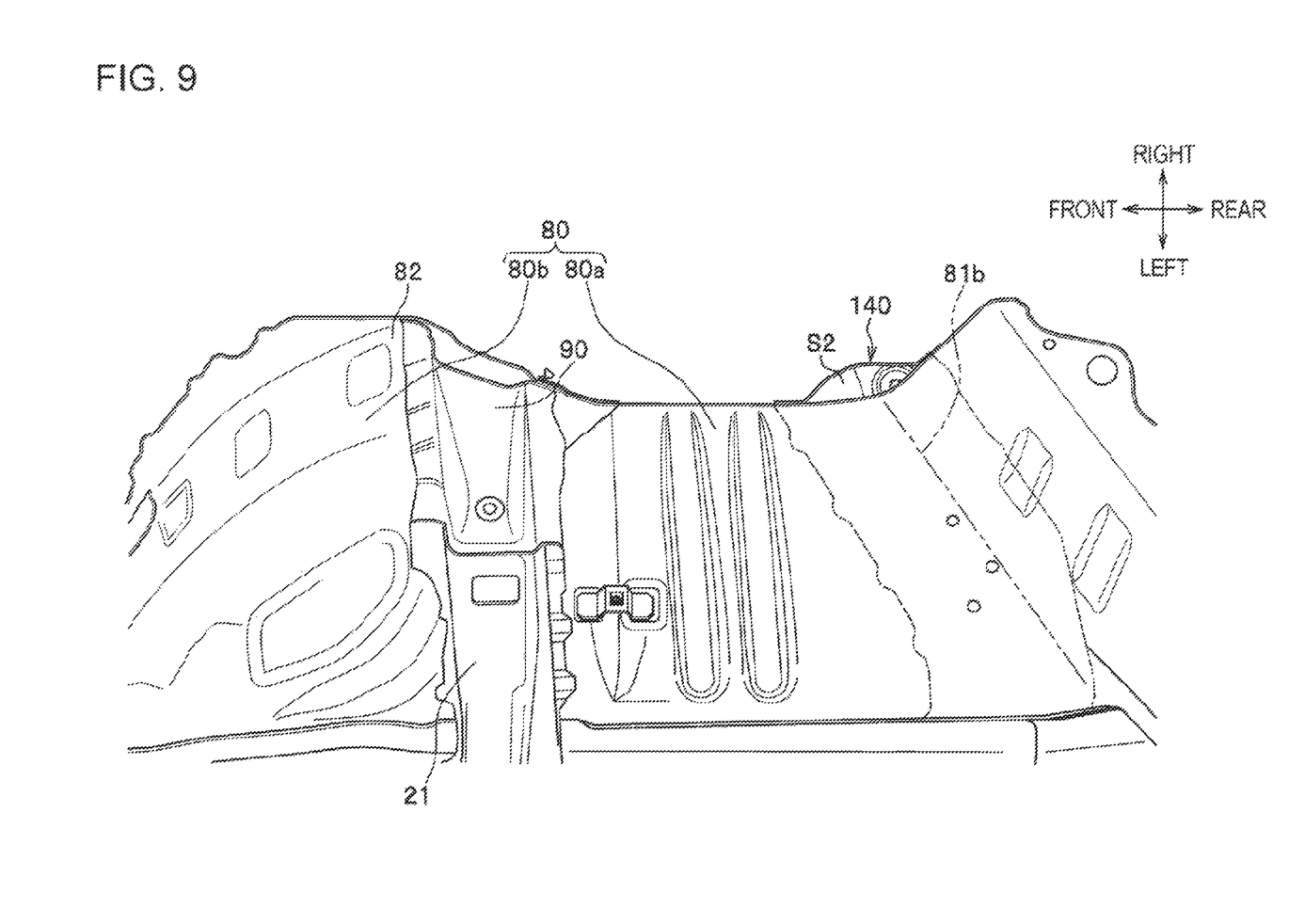
FIG. 9 is a partially sectional, perspective view of the wheel house of the vehicle rear structure according to an embodiment taken along line IX-IX of FIG. 5.

FIG. 8 is a perspective view of a vehicle rear body of the vehicle rear structure according to an embodiment, the vehicle rear body being viewed from the bottom. FIG. 9 is a partially sectional, perspective view of the rear wheel house 80 taken along line IX-IX of FIG. 5.

The vehicle 1 according to the embodiment also includes a second reinforcement member 140 and a third reinforcement, member 150.

The second reinforcement member 140 extends along the ridgeline 81b, extending to the vehicle rear of the mound portion 80a from the damper attachment portion 84 at the top, to form a closed section S2 between itself and the mound portion 80a.

Moreover, a rear pillar 160, which forms a rearmost end of the vehicle rear body, is disposed to the vehicle rear of the rear quarter pillar 70 (see FIG. 1).

The third reinforcement member 150 has a front end 150a connected to the rear quarter pillar 70. The third reinforcement member 150 also has a rear end 150b connected to the rear pillar 160 at a position higher than the front end 150a.

Thus, the third reinforcement member 150 stretches obliquely between the rear quarter pillar 70 and the rear pillar 160 so as to rise toward the vehicle rear.

Now, the operation and effects of the vehicle rear structure according to the embodiment are described.

Figure 11:
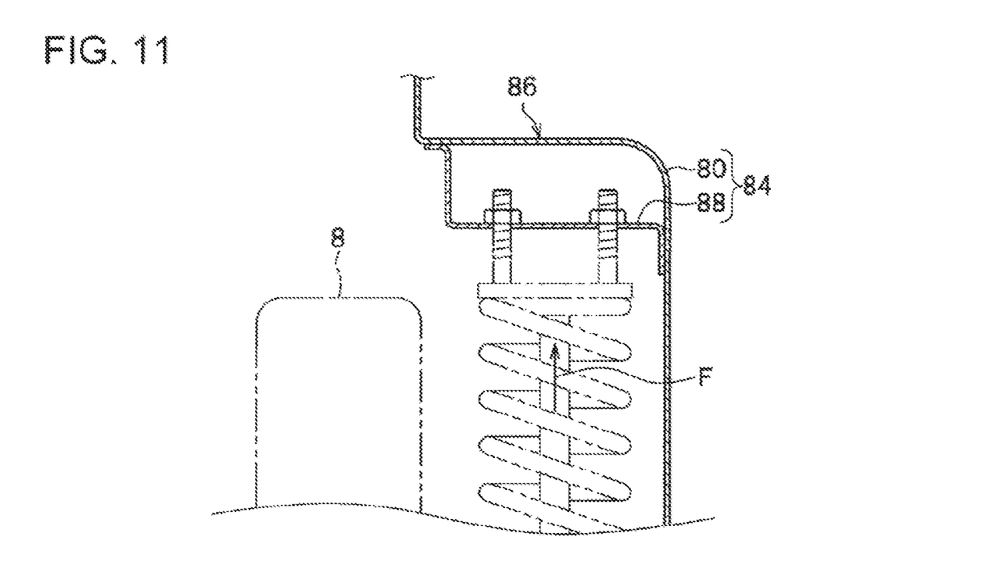
FIG. 11 is a sectional view of a joint of the wheel house of the vehicle rear structure according to an embodiment taken along line XI-XI of FIG. 10.
Figure 12:
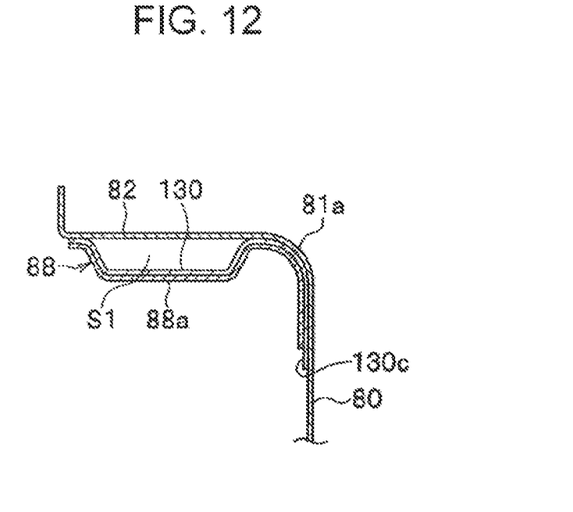
FIG. 12 is a sectional view of a main portion of the vehicle rear structure according to an embodiment, at which panels are joined together, taken along line XII-XII of FIG. 10.

FIG. 10 to FIG. 12 are sectional views of a main portion of the vehicle rear structure according to the embodiment, at which panels are joined together. Here, FIG. 10 is a sectional view of the wheel house of the vehicle rear structure according to the embodiment taken along line X-X of FIG. 5. FIG. 11 is a sectional view of a joint of the wheel house taken along line XI-XI of FIG. 10. FIG. 12 is a sectional view of a main portion at which panels are joined together, taken along line XII-XII of FIG. 10.

In the vehicle rear structure according to the embodiment, the coupling member 130 is joined to the rear-wheel house 80 along the ridgeline 81a (see FIG. 2) of the upper surface portion 82 so as to couple the damper attachment portion 84 to the upper stiffener 90.

Thus, the load F imposed on each damper attachment-portion 84 from the corresponding rear tire 8 is received by the corresponding metal plate 88 and the corresponding protuberance 86 and transmitted from the damper attachment portion 84 to the inner pillar 72 of the corresponding rear-quarter pillar 70, illustrated in FIG. 1, through the corresponding coupling member 130 and the corresponding upper stiffener 90 situated to the vehicle front.

The inner pillar 72 of the rear quarter pillar 70 forms an annular frame 120 (see FIG. 1) together with the coupling member 130. Thus, the load F imposed on the damper-attachment portion 84 is dispersed to the vehicle rear to unable to concentrate the stress.

Moreover, the coupling member 130 is joined to the upper surface portion 82 of the rear wheel house 80 to form a closed section S1 aligned with the direction of the ridgeline 81a.

A portion of the ridgeline 81a at one side to the front of the mound portion 80a of the rear wheel house 80 extends linearly. Thus, the closed section S1 linearly connects the damper attachment portion 84 and the upper stiffener 90 to each other, so that the strength or the rigidity around the ridgeline 81a can be enhanced. The coupling member 130, even formed of a single steel sheet, is capable of fully transmitting the load.

This configuration can achieve weight reduction due to there being no need of an additional reinforcement, member regardless of the position at which the load F is imposed on the damper attachment portion 84 being spaced apart a predetermined distance L in the vehicle front-rear direction from the position at which the upper stiffener 90 is disposed.

The damper attachment portion 84 is shaped so as to protrude from the upper surface portion 82 of the rear wheel house 80. This embodiment allows, even in a vehicle in which the damper attachment, portion 84 is spaced apart from the rear quarter pillar 70, the load imposed on the damper attachment portion 84 to be dispersed by being transmitted from the coupling member 130 to the inner pillar 72 through the upper stiffener 90.

As illustrated in FIG. 2, the load F imposed in the vehicle up-down direction on the damper attachment portion 84 is transmitted from the undersurface of the rear edge portion 130b of the coupling member 130 to the front edge portion 130a situated to the vehicle front at the position obliquely below along the ridgeline 81a.

Although the front edge portion 130a is situated at a lower position than the rear edge portion 130b, the load is transmitted as a force pushing upward the underside of the rear flange portion 90b of the upper stiffener 90, having a hat-shaped section, since the front edge portion 130a is situated opposite to the underside of the rear flange portion 90b with the upper surface portion 82 of the rear wheel house 80 interposed therebetween.

Thus, the load F is constantly being imposed in a direction in which a subsequent member is pushed upward until the load F is transmitted from the damper attachment portion 84 to the rear quarter pillar 70, whereby this configuration has high transmission efficiency.

As described above, in the vehicle rear structure according to the embodiment, the coupling member 130 is joined to the rear wheel house 80 along the ridgeline 81a of the upper surface portion 82 of the rear wheel house 80 to connect the damper attachment portion 84 to the upper stiffener 90. Thus, the load F imposed on the damper attachment portion 84 is dispersed to the vehicle rear to unable to concentrate the stress.

In addition, the coupling member 130 forms a closed section in cooperation with the upper surface portion 82 of the rear wheel house 80.

Thus, the configuration has greater rigidity and is capable of dispersing the load F imposed on the damper-attachment portion 84 to the vehicle rear body.

Each damper attachment portion 84 includes the protuberance 86, on the upper surface portion 82 of the rear wheel house 80, and the metal plate 88, whose periphery is joined to the back surface of the protuberance 86 at an outer-side portion of the protuberance 86 to form a box and which has a substantially L shape.

This configuration thus has greater rigidity and is capable of further effectively dispersing the load F imposed on the damper attachment portion 84 to the vehicle rear body. In addition, the box-shaped configuration having greater rigidity enables thinning of the rear wheel house 80 for weight reduction.

Each rear wheel house 80 includes the mound portion 80a and the arcuate portion 80b. The mound portion 80a is joined to the outer side of the side frame 10 in the vehicle width direction. The mound portion 80a has a mound shape having the damper attachment portion 84 at the top and the ridgelines 81a and 81b extending in the vehicle front-rear direction so as to surround the damper attachment portion 84. The arcuate portion 80b is situated to the vehicle front, of the mound portion 80a in continuous with the mound portion 80a.

Thus, the load F imposed on the damper attachment portion 84 can be dispersed from the arcuate portion 80b to the vehicle rear body.

Moreover, the rear cross member 20, a pair of left and right rear quarter pillars 70, the upper stiffeners 30, joined to inner-side portions of the upper surfaces of the respective rear wheel houses 80, and the roof arch 110 are connected together to form the annular frame 120.

Thus, the load F imposed on the damper attachment portion 84 can be dispersed by being transmitted to the annular frame 120.

As illustrated in FIG. 7, each reinforcement member 22 for widening prevention is disposed on the inner side of the corresponding side frame 10 at the position at which the side frame 10 crosses the corresponding upper stiffener 30 and the rear cross member 20.

This configuration can thus prevent the load F imposed on the damper attachment portion 84 from widening and deforming a portion at which the upper stiffener 90 and the rear cross member 20 cross each other. Moreover, the annular frame 120 has greater rigidity. This configuration can thus efficiently disperse the load F.

In this configuration, the reinforcement member 22 for widening prevention is disposed on the inner side of the side frame 10. Thus, reduction of the interior space can be avoided unlike in the case where an additional reinforcement member is disposed on the outer side of the side frame 10.

As illustrated in FIG. 8, the floorpan cross member 30 is disposed to the vehicle rear of the rear cross member 20 adjacent to the rear cross member 20. A second reinforcement member 140 is connected to the floorpan cross member 30. The second reinforcement member 140 forms a closed section along the ridgeline 81b extending to the vehicle rear of the mound portion 80a from the damper attachment portion 84 at the top (see FIG. 9).

The upper edge 140a of the second reinforcement member 140 is connected to the upper surface of the corner portion 88c of the metal plate 88 (see FIG. 3).

Thus, the imposed load F is also transmitted to the floorpan cross member 30 through the second reinforcement member 140 in addition to the rear cross member 20 constituting the annular frame 120, and is thus capable of being more efficiently dispersed.

The vehicle rear structure according to the embodiment also includes, as illustrated in FIG. 8, the rear pillars 160 to the vehicle rear of the rear quarter pillars 70.

Each rear quarter pillar 70 and the corresponding rear pillar 160 are connected to each other by the corresponding third reinforcement member 150 (see FIG. 1).

In the vehicle rear structure according to the embodiment having the above-described configuration, the load F imposed on the damper attachment portion 84 can be transmitted from the rear quarter pillar 70 to the rear pillar 160, situated at the rearmost position of the vehicle, through the third reinforcement member 150. Thus, this configuration is capable of further efficiently dispersing the imposed load F.

The present application is not limited to the above-described embodiment and can be changed into various different modifications. The above-described embodiment is merely described as an example for easy understanding of the present application. The present application is not necessarily limited to the embodiment including all the components described above. One or more of the components in one embodiment can be replaced with one or more of components in another embodiment. A component of an embodiment may be added to a different embodiment. Some components of an embodiment may be deleted, added to another embodiment, or replaced with components of another embodiment. An example of a modification feasible in the above-described embodiment includes the following case.

The vehicle rear structure according to the embodiment has described the vehicle 1 in which the damper attachment portion 84, shaped so as to protrude from the upper surface portion 82 of the rear wheel house 80, is spaced a predetermined distance L apart from the upper stiffener 90, connected to the rear quarter pillar 70. However, the distance between the damper attachment portion 84 and the rear quarter pillar 70 is not particularly limited to the predetermined distance L according to the embodiment.

We claim:

1. A vehicle rear structure, comprising:
   a pair of left and right side frames, whose longitudinal direction is aligned with a vehicle front-rear direction, respectively;

a cross member that connects the left and right side frames to each other;

left and right rear quarter pillars that are disposed along rear side panels situated at a rear of left and right rear door openings, respectively;

left and right rear wheel houses that are situated below the left and right rear quarter pillars and that accommodate rear tires, respectively, each of the rear wheel houses including an upper wall portion and a damper attachment portion integrated with the upper wall portion and protruding from the upper wall portion;

left and right connecting members that extend from the respective left and right rear quarter pillars across the respective rear wheel houses toward the cross member so as to connect the respective left and right rear quarter pillars to the cross member; and left and right coupling members that connect the respective damper attachment portions to the respective left and right connecting members and that are joined to the respective rear wheel houses along ridgelines of the upper wall portions of the respective rear wheel houses.

2. The vehicle rear structure according to claim 1, wherein each of the coupling members forms a closed section in cooperation with the upper wall portion of corresponding one of the rear wheel houses.

3. The vehicle rear structure according to claim 1, wherein each of the damper attachment portions includes a protuberance,, disposed on the upper wall portion of a corresponding one of the rear wheel houses, and a metal plate, which has a substantially L shape cross section and whose periphery is joined to a back surface of a side of the protuberance to form a box shape.

4. The vehicle rear structure according to claim 1,
wherein each of the rear wheel houses includes a mound shape portion and an arcuate portion,
wherein the mound shape portion is joined to an outer side of a corresponding one of the side frames in a vehicle width direction,
wherein the mound shape portion includes ridgelines extending in the vehicle front-rear direction from a corresponding one of the damper attachment portions as a top of the respective ridgelines so as to have a mound shape surrounding the damper attachment portion, and
wherein the arcuate portion is situated in front of the mound shape portion and in continuous with the mound shape portion.

5. The vehicle rear structure according to claim 1, further comprising:

a roof arch that forms an annular frame in cooperation with the cross member, the rear quarter pillars, and the connecting members joined to upper surfaces of the rear wheel houses respectively, wherein the respective side frames include a widening-prevention reinforcement member on an inner side of a portion thereof at which the respective connecting members and the cross member intersect the respective side frames.

6. The vehicle rear structure according to claim 4, further comprising:

a floorpan cross member disposed at the rear of the cross member; and left and right second reinforcement members that are connected to the floorpan cross member, the second reinforcement members each forming a closed section along the ridgeline of a corresponding one of the mound shape portions extending to the rear.

7. The vehicle rear structure according to claim 1, further comprising:

left and right rear pillars disposed at the rear of the left and right rear quarter pillars, respectively; and left and right third reinforcement members that each connect a corresponding one of the rear quarter pillars and a corresponding one of the rear pillars to each other.

8. The vehicle rear structure according to claim 1, wherein the left and right connecting members are offset from the left and right damper attachment portions respectively in the vehicle front-rear direction, and the left and right coupling members extend in the vehicle front-rear direction.

9. The vehicle rear structure according to claim 8, wherein the left and right coupling members extend downward from the damper attachment portions, respectively.

10. The vehicle rear structure according to claim 2, wherein each of the coupling members is joined to a bottom surface of the upper wall portion of corresponding one of the rear wheel houses.

11. The vehicle rear structure according to claim 10, wherein a longitudinal end of the each of the coupling members is opposite to corresponding one of the connecting members via the upper wall portion disposed therebetween.

12. The vehicle rear structure according to claim 6, wherein the second reinforcement members are each joined to the corresponding one of the mound shape portions.

13. A vehicle comprising the vehicle rear structure according to claim 1.

* * * * *